(12) United States Patent
Raghavan et al.

(10) Patent No.: US 8,201,140 B2
(45) Date of Patent: Jun. 12, 2012

(54) SYSTEM AND METHOD FOR CREATING AND USING GRAPHICAL OBJECT INSTANCES IN A STATECHART ENVIRONMENT

(75) Inventors: Vijay Raghavan, Framingham, MA (US); Beth Cockerham, Melrose, MA (US)

(73) Assignee: The MathWorks, Inc., Natick, MA (US)

( * ) Notice: Subject to any disclaimer, the term of this patent is extended or adjusted under 35 U.S.C. 154(b) by 1261 days.

(21) Appl. No.: 11/216,246

(22) Filed: Aug. 30, 2005

(65) Prior Publication Data
US 2007/0074184 A1    Mar. 29, 2007

(51) Int. Cl.
*G06F 9/44* (2006.01)
(52) U.S. Cl. .................. 717/104; 717/105; 717/106
(58) Field of Classification Search .................. None
See application file for complete search history.

(56) References Cited

U.S. PATENT DOCUMENTS

| | | | |
|---|---|---|---|
| 5,461,573 A * | 10/1995 | Chakradhar et al. .......... 716/4 |
| 5,721,926 A * | 2/1998 | Tamura ........................ 717/104 |
| 6,405,361 B1 * | 6/2002 | Broy et al. ................... 717/104 |
| 6,880,147 B1 * | 4/2005 | Pauly .......................... 717/104 |
| 7,797,671 B2 * | 9/2010 | Kocka ......................... 717/104 |
| 7,797,672 B2 * | 9/2010 | Thompson et al. .......... 717/104 |
| 7,926,025 B2 * | 4/2011 | Campbell et al. ........... 717/104 |
| 2005/0160397 A1 * | 7/2005 | Szpak et al. ................ 717/104 |
| 2005/0262473 A1 * | 11/2005 | Kocka ......................... 717/105 |
| 2006/0200800 A1 * | 9/2006 | Melby ......................... 717/114 |
| 2006/0235548 A1 * | 10/2006 | Gaudette ..................... 700/83 |
| 2006/0236305 A1 * | 10/2006 | Chang et al. ............... 717/106 |
| 2007/0266368 A1 * | 11/2007 | Szpak et al. ............... 717/105 |

OTHER PUBLICATIONS

"Stateflow and Stateflow Coder User's Guide—Modeling Simulation Implementation", The MathWorks, published 2003. Online retrieved at <http://www.mathworks.com/access/helpdesk_r13/help/pdf_doc/stateflow/sf_ug.pdf>.*
G. Hamon, A denotational semantics for stateflow, Sep. 2005, pp. 164-172, <http://delivery.acm.org/10.1145/1090000/1086260/p164-hamon.pdf>.*
Dias et al., Software Architecture Analysis Based on Statechart Semantics, Nov. 2000, 5 pages, <http://delivery.acm.org/10.1145/860000/857220/08840133.pdf>.*
Whittle et al., Generating statechart designs from scenarios, Jun. 2000, pp. 314-323, <http://delivery.acm.org/10.1145/340000/337217/p314-whittle.pdf>.*
Lemay, Laura, "Week 1, Day 2, Object-Oriented Programming and Java," *Teach Yourself JAVA in 21 Days*, Sams.net Publishing, Kitty Wilson ed., pp. 31-54 (1996).

(Continued)

*Primary Examiner* — Thuy Dao
(74) *Attorney, Agent, or Firm* — Nelson Mullins Riley & Scarborough LLP

(57) ABSTRACT

A method of providing multi-instantiable state templates to a statechart environment is discussed. The method includes the step of providing a graphical definition of an independent state machine object belonging to a statechart. The method further includes the step of instantiating a first instance and a second instance of the independent state machine object in the statechart. The method additionally includes the steps of starting execution of the first instance of the independent state machine object and then stopping execution of the first instance of the state machine object. Additionally, the method includes the step of starting the execution of the second instance of the independent state machine object in the state diagram.

22 Claims, 7 Drawing Sheets

OTHER PUBLICATIONS

The Mathworks, "Stateflow® and Stateflow® Coder, for Complex Logic and State Diagram Modeling, User's Guide, version 5," *The Mathworks, Inc.* (1997).

International Search Report for Application No. PCT/US2006/033554, dated Feb. 13, 2007.

The MathWorks, "Stateflow and Stateflow Coder, For Use with Simulink, User's Guide, version 6," The MathWorks, Inc. (2004).

European Office Action for Application No. 06802496.7, dated Sep. 3, 2010.

* cited by examiner

SYSTEM AND METHOD FOR CREATING AND USING GRAPHICAL OBJECT INSTANCES IN A STATECHART ENVIRONMENT

FIELD OF THE INVENTION

The illustrative embodiment of the present invention relates generally to statecharts and more particularly to the provision and use of graphical objects belonging to the statecharts that may be utilized as multi-instantiable state templates.

BACKGROUND

Statechart design environments provide a design tool for modeling and simulating event driven systems and subsystems. Statecharts enable the graphical representation of hierarchical and parallel states and the event driven transitions between them. The statecharts include both logic and internal data and can be used to visually detect a current state during the operation of the system being modeled.

However, while traditional statechart environments enable the graphical modeling of the execution of many systems in an easy to understand format, certain systems do not lend themselves to be modeled in a statechart environment. More particularly, it is often difficult to model a system where a component is represented by multiple state machines each of which may move from one state to another based on temporal and numerical constraints. In these systems with multiple state machines, at any given point during the execution, every component is associated with a single state machine. External conditions then require the switching of the association for the component from one state machine to another. In a traditional statechart environment this type of modeling where the association of the component with the state machine needs to switch dynamically during execution may be attempted by representing the different state machines as separate charts contained in embedded subsystems. Global variables may be made available to the statechart execution environment in order to provide continuity in data to the various state machines. The switching of the association of the component with the state machines may then be accomplished by disabling and enabling the various subsystems containing the independent state machines. Unfortunately, the logic and overhead required in order to save configuration data for the multiple state machines in conventional statechart environments (some of which need to start in a particular restored configuration) is less than optimally efficient. The generation of code from such a system is also less than efficient. Accordingly, it would be desirable to have a mechanism that enabled rapid transitions from one state machine to another in a statechart environment.

BRIEF SUMMARY

The illustrative embodiment of the present invention provides a mechanism for the use of multi-instantiable state templates in a state diagram environment that allow the graphical definition of an independent state machine object. The multiple instances of the independent state machine object may be instantiated within a single statechart. The graphical definition of the independent state machine object includes methods to start and stop the graphical object instances as well as methods to interrogate the instances for internal data and state activity. The use of the graphical objects in the statechart enable rapid transitions from one independent state machine instance to another for systems requiring the rapid switching of state machine data associated with a component.

In one aspect of the illustrative embodiment, a method of providing multi-instantiable state templates to a statechart environment includes the step of providing a graphical definition of an independent state machine object belonging to a statechart. The method further includes the step of instantiating a first instance and a second instance of the independent state machine object in the statechart. The method additionally includes the steps of starting execution of the first instance of the independent state machine object and then stopping execution of the first instance of the state machine object. Additionally, the method includes the step of starting the execution of the second instance of the independent state machine object in the state diagram.

In another aspect of the illustrative embodiment, a distributed system for providing multi-instantiable state templates for a statechart environment includes a server hosting a state diagram environment which includes a statechart. The statechart includes a graphical definition of an independent state machine object belonging to the statechart. The graphical definition of the independent state machine object supports the instantiation of at least a first instance and a second instance of the independent state machine in the statechart. The system further includes a client system communicating over network with the statechart environment. The client system is accessible to a user entering input for forwarding to the statechart environment. The client system receives the results of the chart execution from the statechart environment. Additionally, the system also includes a display surface in communication with the client system which displays the output from the statechart environment to the user.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Figure 1:
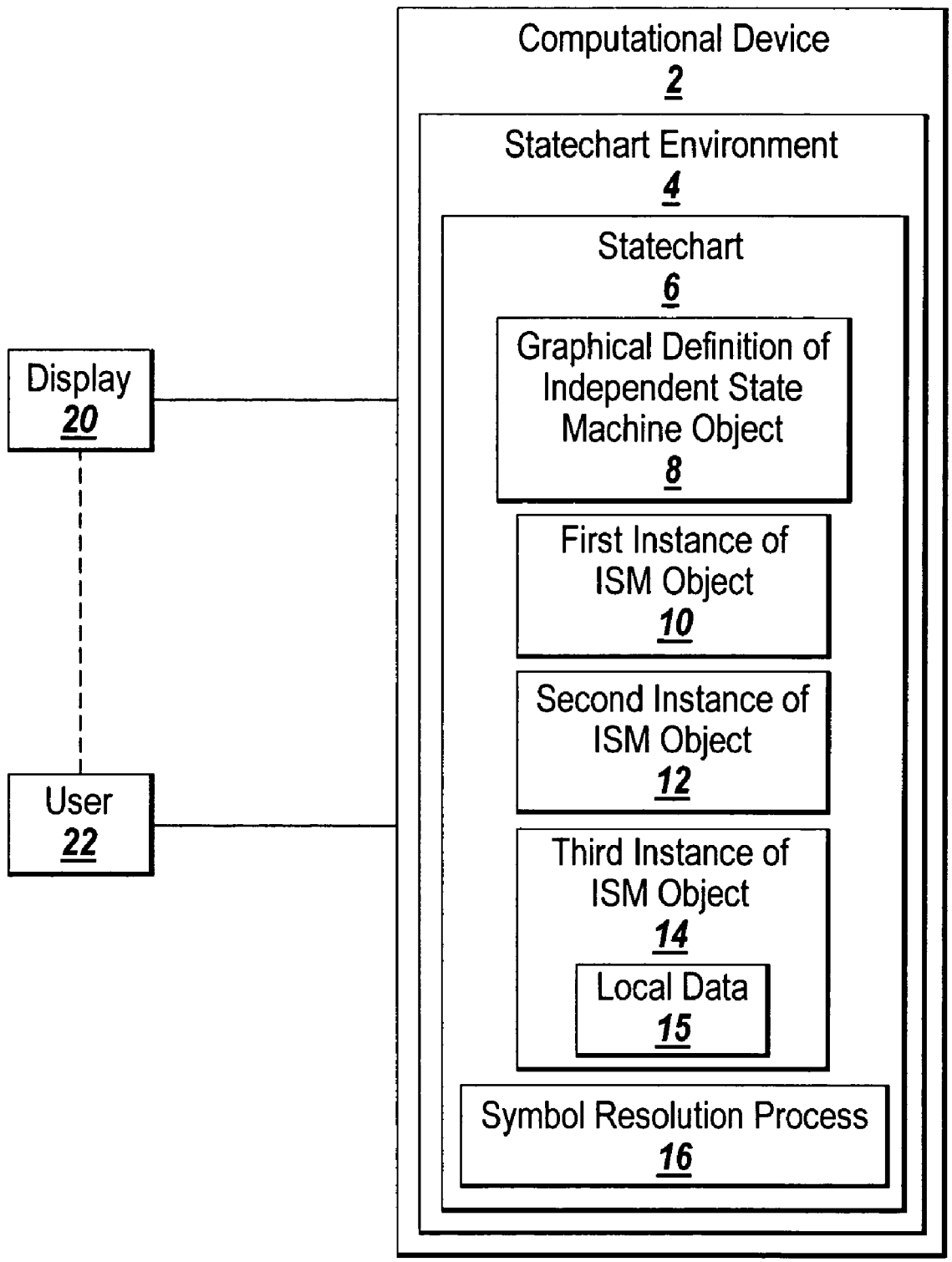
FIG. 1 depicts an environment suitable for practicing the illustrative embodiment of the present invention.

FIG. 1 depicts an environment suitable for practicing the illustrative embodiment of the present invention. A computational device 2 supports a statechart environment 4. The computational device 2 may host the statechart environment 4 or provide access to the statechart environment depending upon the implementation of the present invention. The computational device 2 may be a server, client, workstation, mainframe, laptop, PDA or some other type of computational device equipped with a processor and capable of supporting the statechart environment 4. The statechart environment 4, such as STATEFLOW from The MathWorks, Inc. of Natick, Mass., provides an environment in which to execute statecharts that include instances of the graphical objects of the illustrative embodiment. Also included in the statechart environment 4 is a statechart 6 containing a graphical definition of an independent state machine object 8. The statechart 4 is used to graphically depict the functionality of the system being modeled. The graphical definition of the independent state machine object may be depicted as a chart including symbols and logic which are interpreted by a symbol resolution process 16 to provide the functionality utilized by the present invention. The symbol resolution process 16 may be included in the statechart environment 4 or integrated with the statechart environment. The statechart 6 also includes a first instance of the independent state machine object and a second instance of the independent state machine object 12. The statechart 6 may also include a third instance of the independent state machine object 14 that includes local data 15. The local data 15 is restricted in scope to the third instance of the independent state machine object 14. The computational device 2 is accessed by a user 22 and is in communication with a display device 20.

Figure 2:
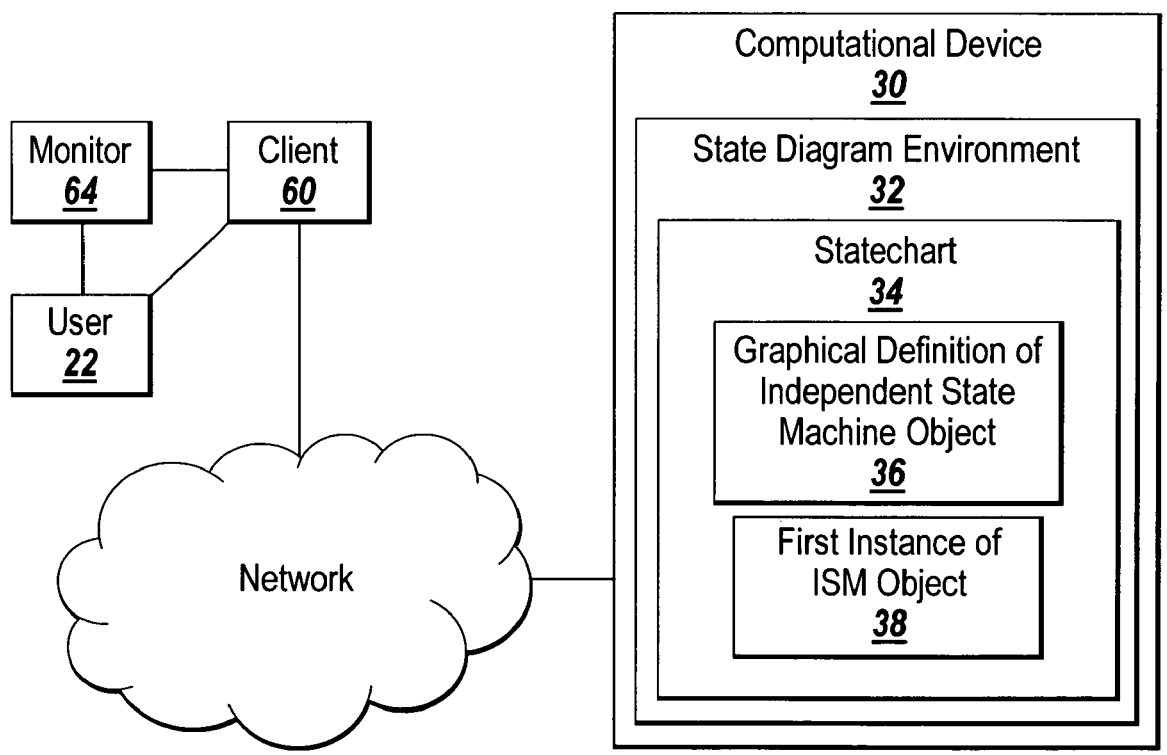
FIG. 2 depicts an alternate distributed architecture suitable for practicing the illustrative embodiment of the present invention.

Those skilled in the art will recognize that the illustrative embodiment of the present invention may also be implemented using distributed architectures. FIG. 2 depicts an alternate distributed architecture suitable for practicing the illustrative embodiment of the present invention. A computational device 30 supports a statechart environment 32. The statechart environment 32 includes a statechart 34 graphically depicting the functionality of a system being modeled. Included in the statechart 34 is a graphical definition of an independent state machine object 36 and a first and second instance of the independent state machine object 38 and 40, respectively. The computational device 30 is in communication with a client device 60 over a network 50. The network 50 may be the Internet, a local area network (LAN), a wide area network (WAN), an extranet, an intranet, wireless network, satellite network, or some other type of network capable of allowing a user 62 accessing the client 60 to communicate with the statechart environment 32 and computational device 30. The user 62 that is accessing the client 60 views the output of operations performed in the statechart environment 32 on a monitor 64 that is communicating with the client 60, the output first being transmitted over the network 50 by the computational device 30.

The graphical definition of the independent state machine object 8 may contain a complete state hierarchy with local data and local events. It may have multiple data inputs and data outputs. The instances of the independent state machine object are instantiated textually in the statechart diagram using instance variables. The instance variables are defined as local data in the statechart diagram with the type set to the name of the independent state machine object. The state transition actions in the independent state machine object follow the standard hierarchical symbol resolution rules within the object instance. For atomic independent state machine objects (which are resolvable without global data), the symbol resolution stops at the boundary of the object. For non-atomic independent state machine objects, an attempt is made to resolve hierarchically symbols not resolved within the object hierarchy in the statechart that contains the object definition. Atomic objects are usefull when defining a library of state diagram templates that do not depend on the external environment. Non-atomic objects are useful in extending the power of objects to access global data more efficiently.

Those skilled in the art will recognize that the graphical definition of the independent state machine object 8 may include multiple types of methods. For example, the independent state machine object definition may include a start method. An object instance of the independent state machine object is initiated and started by calling the start method. Upon an initial call to the start method for the object instance, the default transition paths of the object instance are followed. When the object instance is stopped and then started again, the object instance retains the previous state configuration and does not re-execute the default paths. The object instance may also be marked as valid to execute and perform state consistency checks in case the state configuration was previously manually set. The graphical definition of the independent state machine object may also include a stop method which marks the object instance as not valid to execute. If the object instance is executed after it stops a run-time error may be generated.

The graphical definition of the independent state machine object may further include a reset method which resets the state configuration and the local data so that the next time the object instance is started the default methods are started. Additionally, the graphical definition of the independent state machine object may include a restart method which is a combination of the stop method, reset method and start method as discussed above. Furthermore, the graphical definition of the independent state machine object may include an execute method in which an object instance is executed by textually invoking it similarly to calling a graphical function. In one implementation of the illustrative embodiment, the object instance cannot be executed before the start method is called otherwise a run-time error is generated. Additionally, the graphical definition of the independent state machine object may include GET and SET methods which get and set the state activity and local data of the object instance. Access to state configuration and local data may be provided by dot delimited notation. Write access to the state activity data may be provided only when the instance is stopped.

Figure 3:
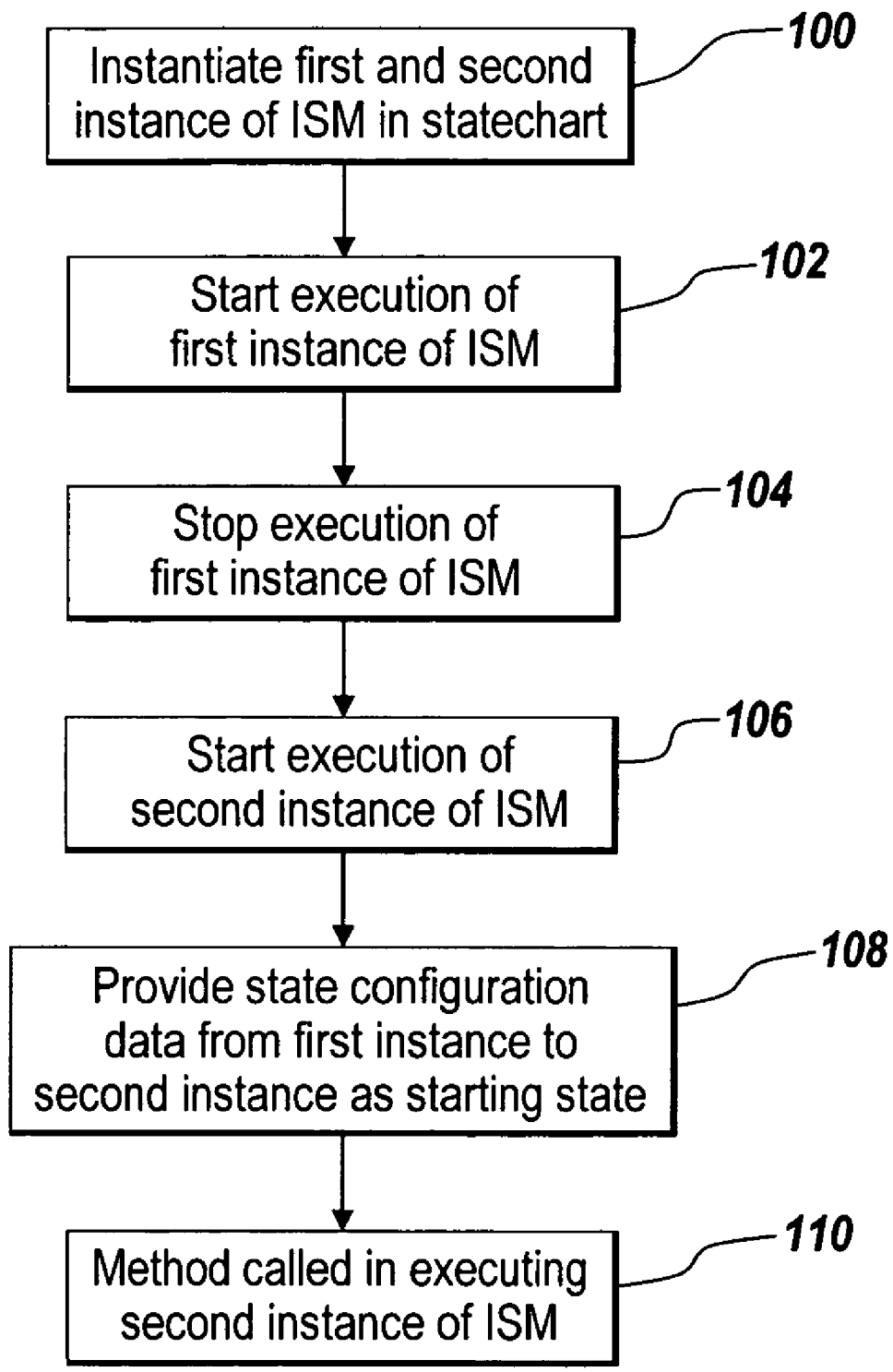
FIG. 3 is a flow chart of a sequence of steps followed by the illustrative embodiment of the present invention to execute multiple instances of an independent state machine object in a statechart generated following the techniques of the present invention.

FIG. 3 is a flowchart of the sequence of steps followed by the illustrative embodiment of the present invention to utilize multiple independent state machine objects in a single statechart thereby allowing rapid switching from one independent state machine to another during execution of a statechart. The sequence of steps begins with the instantiation of a first and second instance of the independent state machine object defined in the statechart (step 100). The first instance of the independent state machine object begins its execution (step 102) as a result of the execution of the statechart in which it is instantiated. Subsequently during the execution of the statechart the execution of the first instance is stopped and the final state configuration data is saved (step 104). The execution of the second instance of the independent state machine is then begun (step 106) and the second instance is provided with the state configuration data previously saved from the execution of the first instance of the independent state object as a starting state (step 108). A method may then be called in the executing second instance to perform a desired action (step 110). The method may be a GET method, a SET method, a start method, a stop method, or another type of method defined in the graphical definition of the independent state machine object.

Figure 4:
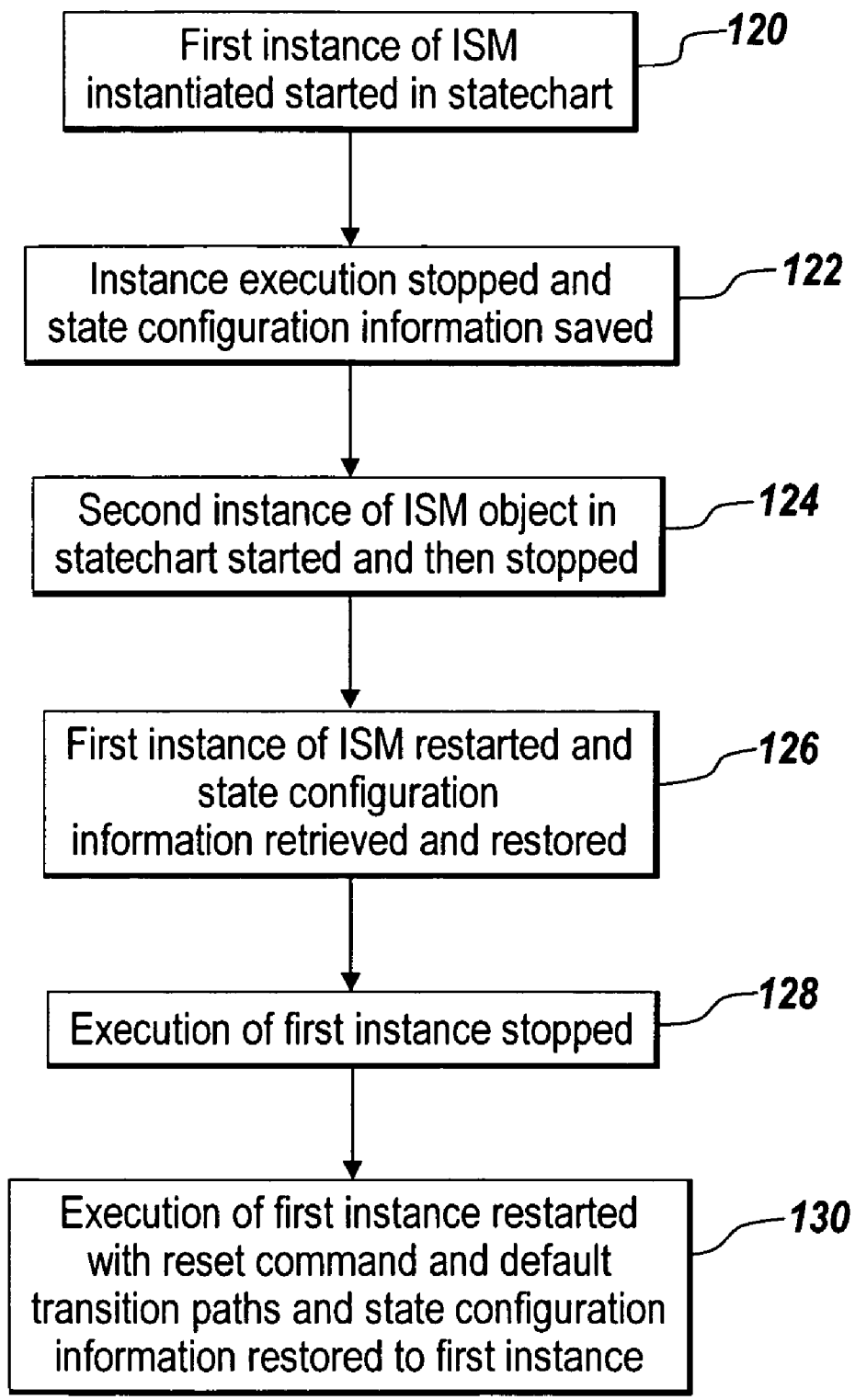
FIG. 4 depicts a sequence of steps followed by the illustrative embodiment of the present invention to swap configuration data from one previously executed instance of the graphical object of the present invention to a second instance of a graphical object of the present invention in a statechart.

FIG. 4 depicts a sequence of steps followed by the illustrative embodiment of the present invention to start and restart instances 10 and 12 of an independent state machine object in a statechart using previously saved state configuration data. The sequence begins when the first instance 10 of the independent state machine object is instantiated and started in the statechart 6 (step 120). Subsequently during the execution of the statechart 6, the executed first instance 10 is stopped and state configuration information is saved (step 122). The second instance 12 in the statechart 6 is then executed and subsequently stopped (step 124). The first instance 10 of the independent state machine object may then be restarted and the state configuration information retrieved and restored from the previously executing second instance 12 (step 126). Or alternatively, the first instance 10 of the independent state machine object may have its own configuration information restored to it upon the restart. The execution of the first instance 10 may then be stopped a second time (step 128). The first instance 10 may then be restarted with a reset command which results in a default transition path being executed and state configuration information being restored to the first instance 10 prior to the first instance beginning execution following the reset command (step 130).

The illustrative embodiment of the present invention also provides automatic code generation which generates code in an efficient manner. For example, in a STATEFLOW statechart environment, the STATEFLOW code-generation process is essentially a compilation process that transforms a high-level representation of a Stateflow diagram into lower-level C-code. This process has three distinct phases, the parsing of textual action language statements that comprise state/transition actions and conditions, the construction of an in-memory intermediate representation of the state-diagram, and the transformation of the intermediate representation. The parsing of textual action language statements that comprise state/transition actions and conditions creates a set of Abstract Syntax Trees (ASTs) that are attached to the Stateflow objects (states and transitions). The construction of an in-memory intermediate representation of the state-diagram uses the ASTs to fully capture the semantics of the state diagram. The output of this stage is a high-level representation that consists of a call-graph of functions (which contain control-flow graphs consisting of nodes and edges) and high-level nodes, operators, and types to account for matrix, complex and fixed-point quantities that arise from the front-end languages (e.g.: Stateflow and Embedded MATLAB). The transformation phase gradually lowers this intermediate representation to a lower-level representation that is convertible to other languages such as C.

Every object instance of an independent state machine object will yield a set of functions corresponding to the states contained within. These functions are different from the usual state functions in that they have an additional input parameter that contains the current-state configuration. For example, the exit_atomic function for a state contained in an object instance would look like this:

```
Exit_Atomic(CurrentStateVariables)
{
    Perform Exit Actions(CurrentStateVariables);
    Mark State Inactive(CurrentStateVariables);
}
```
Note that, in contrast, the same functions for a state outside of an object instance would NOT carry the additional parameter "CurrentStateVariables".

In addition, object instances have additional functions as follows:

```
1. Start
2. Stop
3. Reset
4. Restart
5. Execute
Start(CurrentStateVariables)
{
    Mark Object Instance Active;
}
Stop(CurrentStateVariables)
{
    Mark Object Instance Inactive;
}
Reset(CurrentStateVariables)
{
    Set CurrentStateVariables to their default values(usually zero)
}
Restart(CurrentStateVariables)
{
    Call Reset(CurrentStateVariables)
    Call Start(CurrentStateVariables)
}
Execute(CurrentStateVariables)
{
    If(Object Instance is active) {
        Call the During() of the Object Instance
    }
}
```

The illustrative embodiment of the present invention thus allows the computation of the total number of object instance variables needed for every object instance. The computations are performed by using traditional graph-search algorithms to identify the definitions of the total number of object instance variables across all control-flow graphs corresponding to the chart. Live-range analysis on the object instance variables may be performed to figure out which object instances can share the same memory. A traditional compiler analysis called "live-range analysis" can be used to track the uses and definitions of the object instance variables across the control-flow graphs to figure out which ones can be reused. This will further minimize the number of object instance variables. Also, the illustrative embodiment of the present invention allows the identification of singleton object instances to avoid "pointer-dereferencing". If there is only a single object instance variable that is required, then there is no need to provide an additional input "CurrentStateVariables" to the object instance functions. The object instance variables corresponding to the object instance can be treated as global variables with direct access. This will yield run-time efficiencies by minimizing indirect accesses. Inline-analysis to remove function-call overhead for the object instances may also be performed to minimize the number of function calls and correspondingly limit the function-call overhead. All of the types of analysis discussed above result in the generation of code allowing the object instances to be realized as a combination of functions and local data.

Figure 5A:
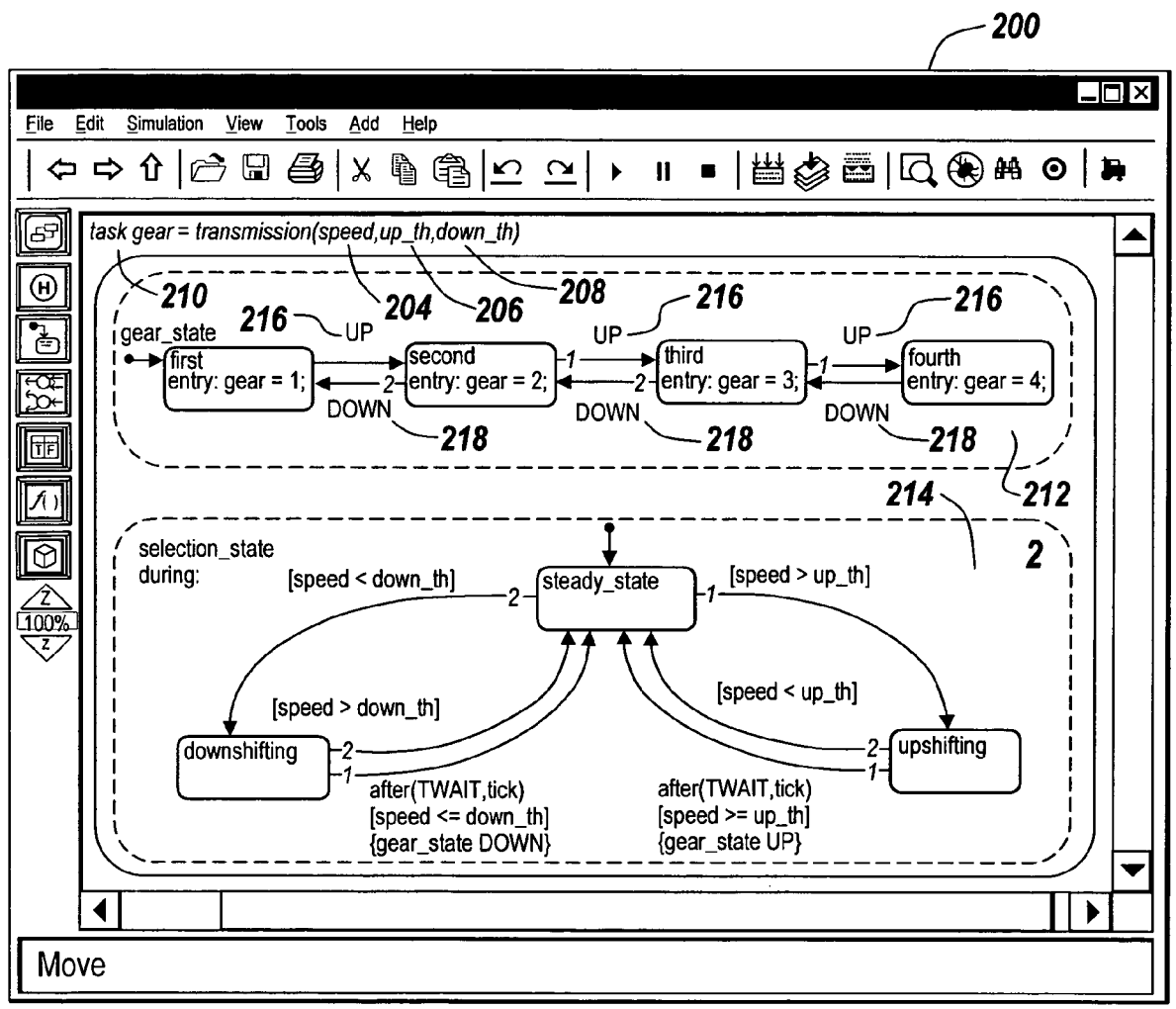
FIG. 5A is a screenshot depicting a graphical definition of an independent state machine object belonging to a statechart.

The graphical definition of the independent state machine object used in the illustrative embodiment may be further explained with reference to FIGS. 5A-5C. FIG. 5A is a screenshot 200 depicting a graphical definition of a named independent state machine object belonging to a statechart. An independent state machine object transmission is graphically defined. The named "transmission" object graphical definition includes three input data speed 204, up_th 206, and down_th 208. The transmission object also has one output data gear 210. Additionally, the transmission object definition includes a hierarchy of states, parallel 212 and XOR 214, and local events UP 216 and DOWN 218.

The illustrative embodiment allows multiple instance of the graphically defined object to be instantiated in the same statechart. FIG. 5B is a screenshot showing a listing of two instances of the independent state machine object defined in FIG. 5A. The two instances trans1 220 and trans2 222 are both defined to have local scope 224 and be of data type 226 "transmission", the name of the graphically defined independent state machine object.

Figure 5B:
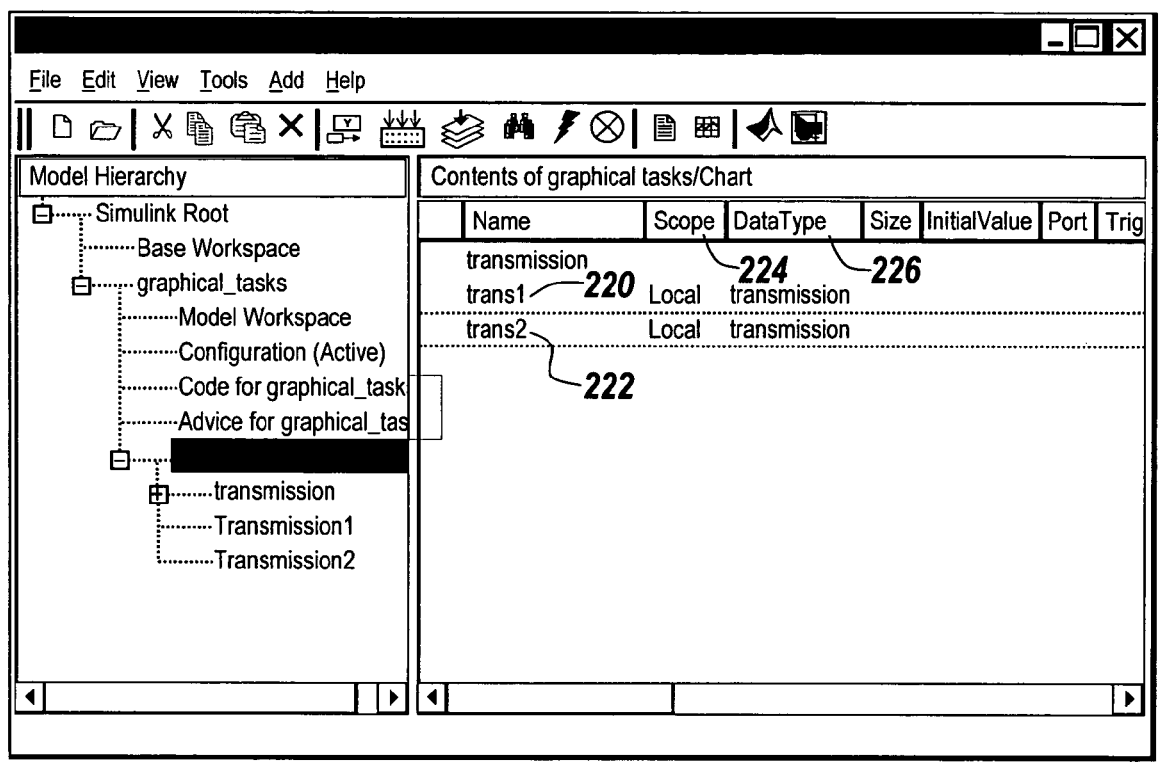
FIG. 5B is a screenshot showing a listing of two instances of the independent state machine object defined in FIG. 5A.
Figure 5C:
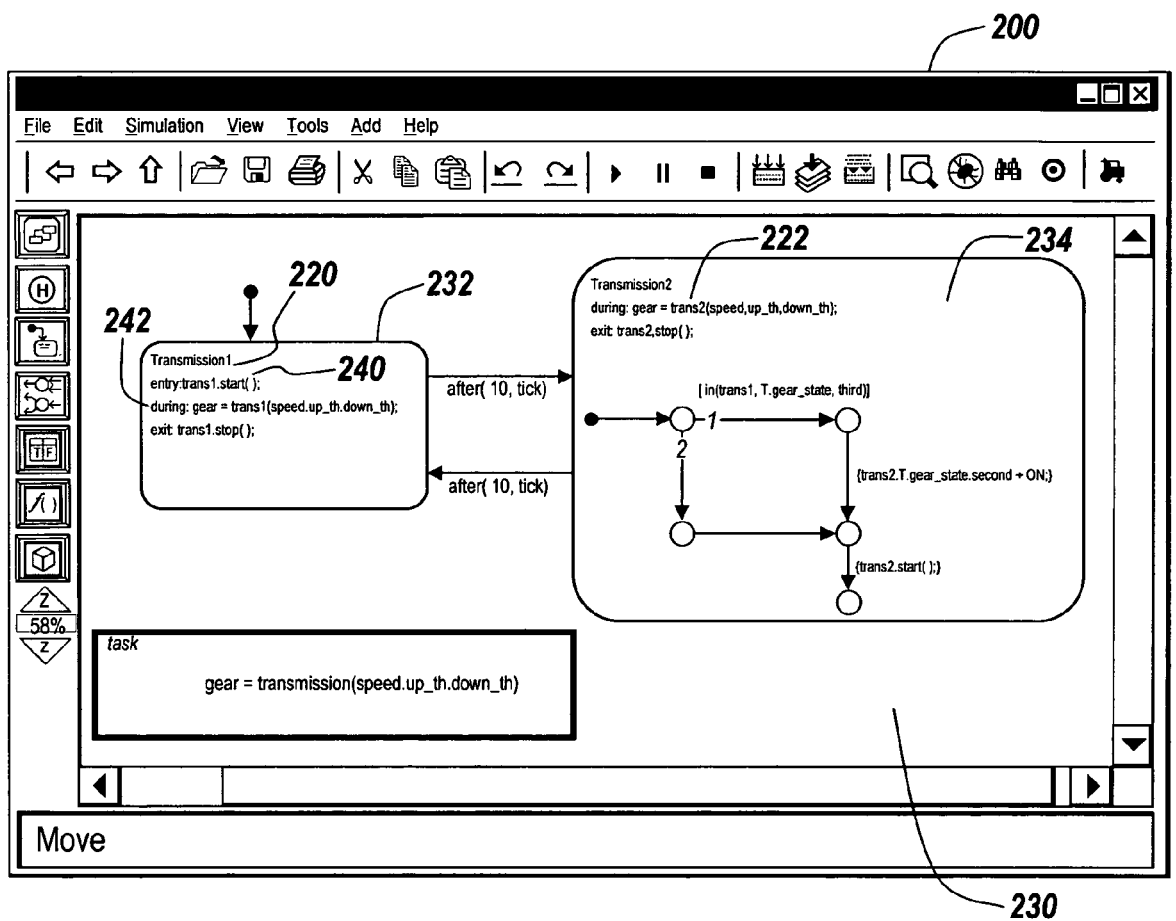
FIG. 5C is a screenshot showing a statechart utilizing the two instances of FIG. 5B.

FIG. 5C is a screenshot showing a statechart 230 utilizing the two instances of FIG. 5B. The statechart includes states Transmission1 (232), Transmission2 (234) and a component gear 236. The state Transmission1 (232) includes the instance trans1 220 while the state Transmission2 (234) includes the instance trans2 (222). When the state Transmission1 is first activated, the entry action invokes the "start" method 240 of the instance trans1 220. The "during" function 242 in Transmission1 (232) executes trans1 220 by passing trans1 its input/output data. When the state Transmission1 (232) exits and the state Transmission2 (234) is entered, the instance trans1 220 is stopped and the instance trans2 (222) is started. It should be noted that the final state configuration in trans1 220 is interrogated to set a default active state in trans2 (222) which overrides the default transition paths.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more mediums as object code.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method of providing multi-instantiable state templates to a statechart environment, the method comprising:
   receiving, using a processor, a graphical definition of an independent state machine object belonging to a statechart;
   receiving an indication to instantiate a first instance and a second instance of the independent state machine object in the statechart;
   instantiating, by the processor, the first instance and the second instance of the independent state machine object in the statechart, the first instance and the second instance being distinct instances;
   receiving at the second instance a last state configuration, the last state configuration:
      being a last state configuration of the first instance, and
      representing a local configuration that includes information that is internal to the first instance of the independent state machine object;
   configuring the second instance based on the last state configuration, the configuring establishing the last state configuration of the first instance as a starting state configuration of the second instance; and
   starting execution of the second instance of the independent state machine object.

2. The method of claim 1 wherein at least one of the first instance or the second instance or a third instance of the independent state machine object includes a state hierarchy with local data and local events.

3. The method of claim 2 wherein symbol resolution is performed within a boundary of the at least one of the first instance or the second instance or the third instance of the independent state machine object.

4. The method of claim 2 wherein symbol resolution is performed within the statechart and external to a boundary of the at least one of the first instance or the second instance or the third instance of the independent state machine object.

5. The method of claim 1 wherein the definition of the independent state machine object includes default transition paths for an initial execution of at least one of the first instance or the second instance or a third instance of the independent state machine object.

6. The method of claim 1 wherein an executing instance of the independent state machine object is stopped and restarted using a previous state configuration from a previous execution of the executing instance.

7. The method of claim 1 wherein the definition of the independent state machine object includes code to reset a collection of state configuration and local data in a previously executed instance of the independent state machine object so that at least one default transition path will be followed by the previously executed instance of the independent state machine object upon a restart of the previously executed instance.

8. The method of claim 1 wherein the definition of the independent state machine object includes code to retrieve a collection of state configuration or local data in at least one of the first instance or the second instance or a third instance of the independent state machine object.

9. The method of claim 1 wherein the definition of the independent state machine object includes code to set a collection of state configuration or local data in at least one of the first instance or the second instance or a third instance of the independent state machine object.

10. The method of claim 1, further comprising:
   instantiating more than two instances of the independent state machine object in the statechart.

11. The method of claim 1, further comprising:
   analyzing at least one of the first instance or the second instance or a third instance of the independent state machine object to determine a total number of variables to be used in an automatic generation of code; and
   using the total number of variables in the automatic generation of code.

12. The method of claim 1, further comprising:
   identifying at least two of a plurality of instances of the independent state machine object containing variables able to share a memory location; and
   generating code automatically for the at least two of the plurality of instances based on the identifying.

13. The method of claim 1, further comprising:
   performing an inline-analysis on at least one of the first instance or the second instance or a third instance of the independent state machine object; and
   generating code automatically for the at least one of the first instance or the second instance or the third instance based on the inline-analysis.

14. The method of claim 1, wherein the indication to instantiate the first instance and the second instance of the independent state machine object is received from a user.

15. The method of claim 1, further comprising:
starting execution of the first instance of the independent state machine object; and
stopping execution of the first instance of the independent state machine object.

16. A distributed system for providing multi-instantiable state templates for a statechart environment, the system comprising:
a server hosting a statechart environment executing a statechart, the statechart including a graphical definition of an independent state machine object belonging to the statechart, the graphical definition of the independent state machine object supporting an instantiation of at least a first instance and a second instance of the independent state machine object in the statechart, the first instance and the second instance being distinct instances, the second instance of the independent state machine object receiving a last state configuration from a previous execution of the first instance of the independent state machine object, the last state configuration of the first instance:
being established as a starting state configuration of the second instance, and
representing a local configuration that includes information that is internal to the first instance of the independent state machine object;
a client system communicating over a network with the state diagram environment, the client system accessible to an input for forwarding to the statechart environment; and
a display surface in communication with the client system, the display surface displaying the output from the state diagram environment.

17. The system of claim 16 wherein the chart includes more than two instances of the independent state machine object.

18. The system of claim 16 wherein at least one of the first instance or the second instance or a third instance of the independent state machine object is analyzed in order to automatically generate code.

19. In a computational device, a non-transitory computer-readable medium storing executable instructions for a method of providing multi-instantiable state templates to a statechart environment, the instructions comprising instructions for:
receiving a graphical definition of an independent state machine object belonging to a statechart;
receiving an indication to instantiate a first instance and a second instance of the independent state machine object;
instantiating the first instance and the second instance of the independent state machine object in the statechart, the first instance and the second instance being distinct instances;
receiving at the second instance a last state configuration, the last state configuration:
being a last state configuration of the first instance, and
representing a local configuration that includes information that is internal to the first instance of the independent state machine object;
configuring the second instance based on the last state configuration, the configuring establishing the last state configuration of the first instance as a starting state configuration of the second instance; and
starting execution of the second instance of the independent state machine object in the state diagram.

20. The medium of claim 19, wherein the method further comprises:
instantiating more than two instances of the independent state machine object in the statechart.

21. The medium of claim 19, wherein the definition of the independent state machine object includes a method to retrieve a collection of state configuration or local data in at least one of the first instance or the second instance or a third instance of the independent state machine object.

22. The medium of claim 19 wherein the definition of the independent state machine object includes a method to set a collection of state configuration or local data in at least one of the first instance or the second instance or a third instance of the independent state machine object.

* * * * *